Aug. 21, 1951            H. LIEBERHERR            2,565,080
METHOD OF REGULATING THE SUPERCHARGE PRESSURE
OF INTERNAL-COMBUSTION ENGINES IN REVERSIBLE
MARINE PROPULSION PLANTS
Filed Nov. 5, 1943            3 Sheets-Sheet 1
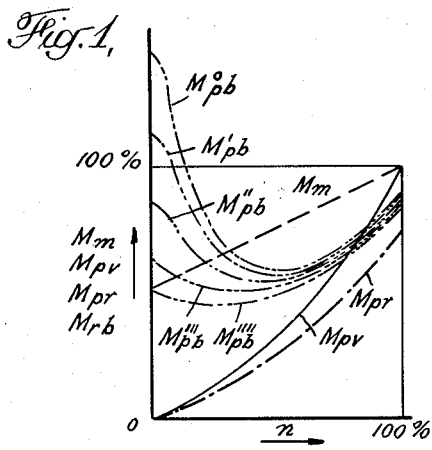
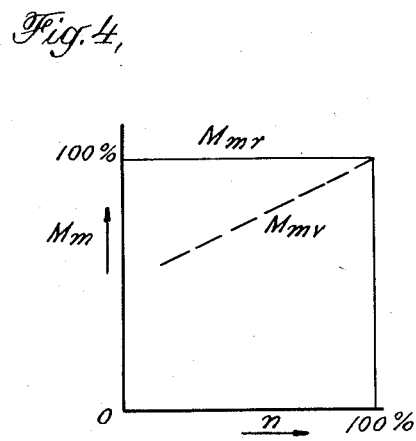
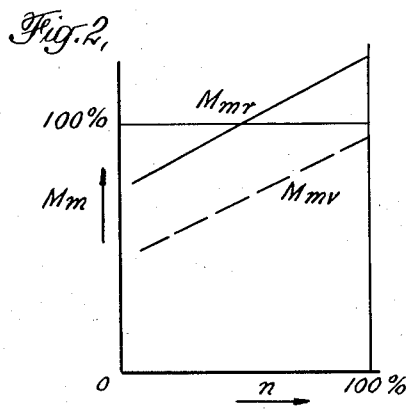
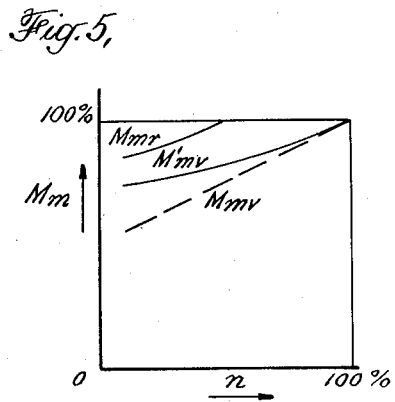
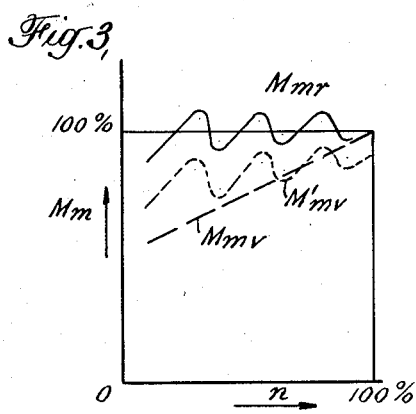
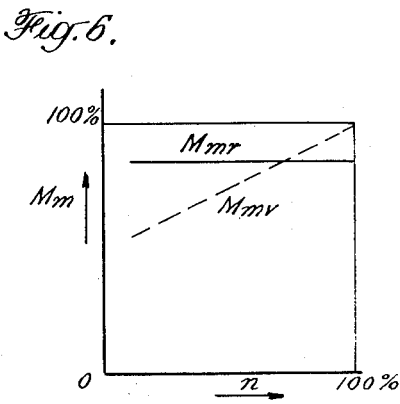
INVENTOR
*Hans Lieberherr*
BY
ATTORNEYS

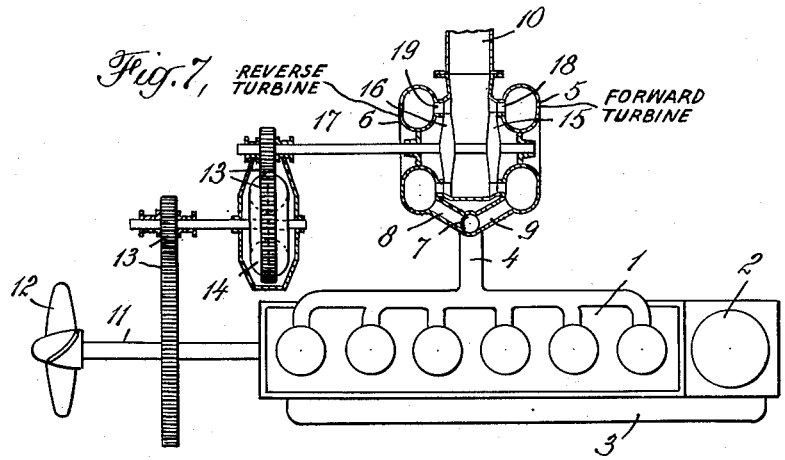
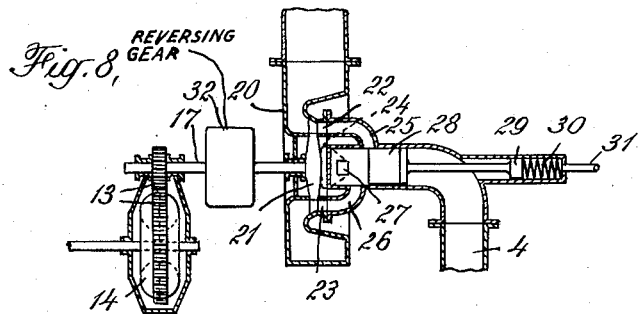
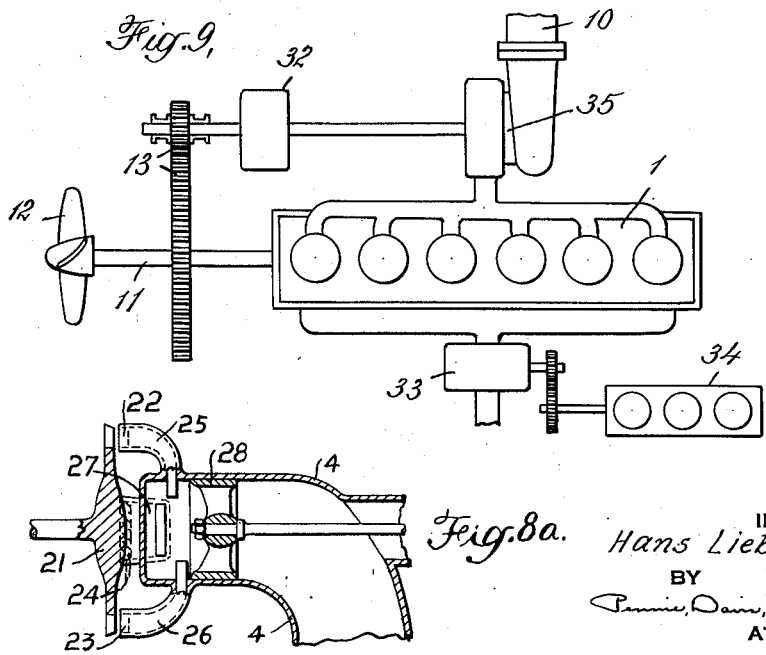

Aug. 21, 1951        H. LIEBERHERR       2,565,080
METHOD OF REGULATING THE SUPERCHARGE PRESSURE
OF INTERNAL-COMBUSTION ENGINES IN REVERSIBLE
MARINE PROPULSION PLANTS
Filed Nov. 5, 1943                                                   3 Sheets—Sheet 3
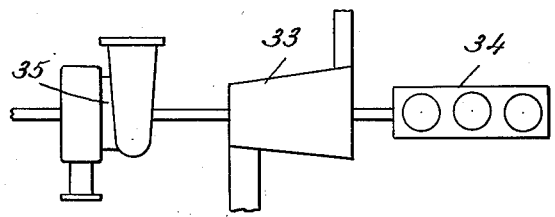
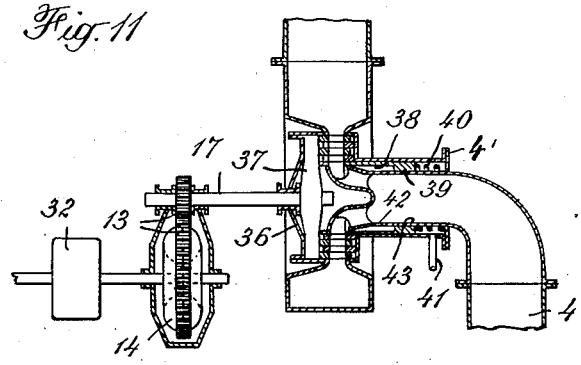 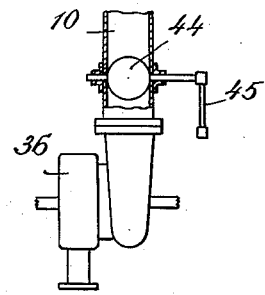
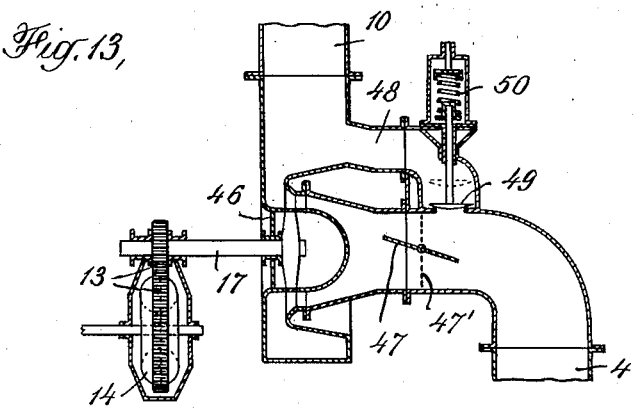
INVENTOR.
Hans Lieberherr
BY
ATTORNEYS Patented Aug. 21, 1951

2,565,080

UNITED STATES PATENT OFFICE 2,565,080

METHOD OF REGULATING THE SUPERCHARGE PRESSURE OF INTERNAL-COMBUSTION ENGINES IN REVERSIBLE MARINE PROPULSION PLANTS

Hans Lieberherr, Winterthur, Switzerland, assignor to Sulzer Freres, Société Anonyme, Winterthur, Switzerland Application November 5, 1943, Serial No. 509,072
In Switzerland February 26, 1943

4 Claims. (Cl. 60—13)

The invention relates to a method of working of marine propulsion plant provided with at least one reversible internal combustion engine, which has a supercharging compressor and a turbine driven by the exhaust gases from the engine and drives a propeller.

Supercharged internal combustion engines—in particular those with increased supercharging pressures—have the peculiarity that the highest attainable turning moment falls off swiftly when the speed is decreased, since then the compressor also runs at a lower speed and the average pressure in the working cylinder falls as a result. When a ship is being slowed down from motion ahead, the propeller, which is still driven round by the currents of the water, opposes a particularly high moment to the internal combustion engine, which is now rotating in reverse. When a ship has to be turned, the internal combustion engine first runs at low speed, and thus with low turning moments; and these lie far below the opposite moment of the propeller, which is still driven round by the water. This leads to the disadvantageous result that vessels equipped with supercharged internal combustion engines can only bring the engines into reverse after a long slowing-down distance has been covered and therefore have a considerably longer braking path than vessels with non-supercharged internal combustion engines.

This disadvantage can be overcome according to the method of the invention in that the supercharging pressure—in particular at low speeds of the engine—is set higher for reverse running of the internal combustion engine than for forward running. Here care should be taken to see that the supercharging pressure is not too high for reverse speeds over the normal range. In a plant intended to embody this method, a device is provided with the help of which the engine can be set at a higher supercharging pressure when in reverse than when running forwards.

The use of the method of the invention makes it possible when a supercharged internal combustion engine is running in reverse, to develop a turning moment even at low speeds which is great enough to drive the propeller in reverse even after a short slowing-down distance. In this way the whole braking path of the vessel to the point of standstill is considerably shortened.

The method of the invention can be carried out in many ways. Thus, for example, the supercharging pressure applying at normal forward speed can be set at a considerably lower speed for reverse running. When the engine is put in reverse, a supercharging pressure can be maintained, even at a standstill or at least at very low engine speeds, which is at least approximately as great as the supercharging pressure maintained at normal forward speed.

In a plant according to the invention separate exhaust-gas turbines can be provided for forward running and for reverse running of the internal combustion engine, the turbine intended for reverse running having a smaller absorption capacity than the one intended for forward running. A higher supercharging pressure will then come into effect when the engine is in reverse than when it is running forward. The forward turbine and the reverse turbine may run at the same speed, it being preferable that the reverse turbine has a larger number of stages than the forward turbine. It is best for both turbines to be arranged on the same shaft.

It is also possible for nozzles to be cut out at the exhaust-gas turbine when the internal combustion engine runs in reverse, the absorption capacity being in this way diminished and a higher supercharging pressure obtained. The supercharging compressor may be coupled to a special driving engine, with the help of which a higher supercharging pressure can be obtained when the engine is in reverse than when it is running forwards.

By the term "absorption capacity" is meant the flow capacity of the turbine, under given operating conditions, measured volumetrically. The effect of reducing the absorption capacity is, therefore, to cause gases produced in excess thereof to accumulate in the cylinders of the internal combustion engine.

A plant according to the invention may, for example, have a volumetrically acting compressor and a throttle device flowed through by the exhaust gases, with the help of which a higher supercharging pressure can be obtained when the engine is in reverse than when it is running forwards. This throttle device can be arranged before or after an exhaust-gas turbine and may, for example, be brought into action only after the internal combustion engine has been put in reverse.

The invention is explained in more detail below with the help of the drawings.

Figs. 1–6 illustrate the behaviour of the turning moments of propellers or engines at various speeds. In all figures the speed of the propeller or of the engine is shown to the same scale on the abscissae, the value of 100% corresponding to the speed at full engine power. The moments are shown along the ordinates in all diagrams. The turning moment at full speed ahead or at full forward engine speed was taken as 100%. Fig. 1 shows the turning moment conditions arising at a propeller, while Figs. 2-6 show the course taken by the turning moments which can be maintained in various selected examples of the invention according to Figs. 7-13.

Fig. 7 shows an example of execution of the invention in which separate exhaust turbines are provided for the forward running and for the reverse running of the internal combustion engine.

Fig. 8 is an exhaust-gas turbine in which nozzles can be cut out when the internal combustion engine is running in reverse.

Fig. 8a is an enlarged fragmentary view of a part of the apparatus of Fig. 8.

In Figs. 9 and 10 are seen plants, the supercharging compressors of which are coupled to special driving engines.

Figs. 11, 12 and 13 show the exhaust-gas turbines of plants which have a throttle device flowed through by the exhaust gases.

The turning moment which is opposed by a propeller at various forward speeds of the prime mover has a parabolic curve as shown by the full line $M_{pv}$ (Fig. 1). The reverse turning moment, as a result of the bad profile conditions of the propeller blades as they cut through the water in an opposite direction, shows a curve of low values, seen in the chain-dotted line $M_{pr}$. The curves $M_{pv}$ and also $M_{pr}$ represent the starting of the vessel from a standstill. The course of the moments changes considerably if a vessel has to be braked to a standstill from motion ahead by the rotating of the propeller in reverse and, in given cases, has to be accelerated astern.

The group of chain-dotted curves $M_{pb}$ shows various courses taken by the turning moment during braking, these having been arrived at by calculation on the assumption of the most favourable behaviour possible. The curve $M_{pb}{}^0$ is based on the shortest braking time or the shortest braking path, while a considerably longer braking path and braking time are taken for the curve $M_{pb}''''$. If the braking time and braking path are further prolonged, the group of curves $M_{pb}$ finally merge into the curve $M_{pr}$, which is calculated for starting up in reverse from a standstill. As an aid to comparison, the highest forward driving moment obtainable for the supercharged internal combustion engine, $M_m$, is also shown in the diagram.

From the course taken by the group of curves $M_{pb}$ and the curve $M_m$ it follows that the vessel can be slowed down only in the long braking time corresponding to the curve $M_{pb}''''$, because this curve alone runs below the curve $M_m$ at all engine speeds. If it should be attempted to slow the vessel down in a shorter time, then, at least at low speeds, the moment curve $M_{pb}$ would lie above the driving moment curve $M_m$, so that the internal combustion engine could not come into action at all.

If according to the method of the invention the supercharging pressure is set higher when the internal combustion engine is in reverse than when it is running forwards, then a higher average pressure is obtained in the working cylinders, and this in its turn produces a greater driving moment at the shaft. As soon as a high driving moment is obtained at low speeds, a vessel can be slowed down in a considerably shorter time, for example according to the curves $M_{pb}'''$ or $M_{pb}''$.

In Figs. 2-6 a number of moment curves are represented, which can be attained when observing the method of the invention. For purposes of comparison the normal forward curve $M_{mv}$ is given in every diagram, as can be seen from Fig. 1, and above it is given the higher moment curve $M_{mr}$ obtained when the engine is in reverse and the method of the invention is employed. The moment curves are not shown from the speed of 0, but only from a speed at which the engine begins to fire. At speeds lying below the ignition speed, the moment can be still further increased by an abundant supply of starting air.

The course of the moments shown in Fig. 2 can be attained with an engine plant according to Fig. 7, that shown in Fig. 3 with an engine according to Fig. 8, that shown in Fig. 4 with an engine according to Figs. 9 or 10, that shown in Fig. 5 with an engine according to Figs. 11 and 12, and finally that shown in Figs. 6 with an engine according to Fig. 13.

The engine plant shown in Fig. 7 has a six-cylinder internal combustion engine 1 which is equipped with a reciprocating compressor 2 for compressing the supercharging air. This reciprocating compressor is coupled direct to the crankshaft of the internal combustion engine. The compressed supercharging air passes through the air pipe 3 to the cylinders, while the exhaust gases flow through pipe 4 to one of the two exhaust-gas turbines 5 or 6. The exhaust-gas turbine 5 is in service when the engine is running forwards, while exhaust-gas turbine 6 is loaded when the engine is in reverse.

For directing the exhaust gases to one turbine or the other a rotary slide valve 7 is used, which in one position closes the supply pipe 8 of the reverse turbine 6 and in the other position closes the supply pipe 9 of the forward turbine 5. After the gases have been expanded in one of the exhaust-gas turbines they flow off through the pipe 10. The output of the internal combustion engine 1 is transmitted to a ship's screw 12 by means of shaft 11. In order to contribute to the output of the shaft, the output of the exhaust-gas turbine is transmitted by way of reduction gearing 13, which diminish the speed of rotation, and by way of the liquid coupling 14 to the shaft 11.

The rotor 15 of the forward turbine 5 and the rotor 16 of the reverse turbine 6 are keyed on the same shaft 7. The blades of each rotor are so placed that the forward turbine exerts a drive in the forward direction of rotation and the reverse turbine a drive in the reverse direction of rotation. The guide passages 19 of the reverse turbine have a smaller sectional area than the guide passages 18 of the forward turbine and the reverse turbine has less volumetric absorption capacity than the forward turbine. Consequently the gases are accumulated in the cylinders of the internal combustion engine. The same gas quantity leaves both turbines but that from the reverse turbine has a smaller volume and higher pressure giving an increase in the supercharging pressure when running astern.

In this way, during scavenging, a smaller quantity of excess air is admitted through the cylinders into the exhaust-gas turbine when the engine is running forwards than when it is in reverse. The internal combustion engine therefore works with higher supercharging and with a greater average pressure when running in reverse than when running forwards. The internal combustion engine, as a result, produces a greater moment when in reverse than when running forwards. In spite of the decreased sectional area of flow of the reverse turbine, a greater temperature drop with an equal quantity of gas is available for it, so that it is capable of giving off a greater turning moment.

The course taken by the turning moment, when the engine of the plant according to Fig. 7 is running forwards or in reverse, can be gathered from Fig. 2. While the forward moment $M_{mv}$ runs normally, the reverse moment $M_{mr}$ lies throughout considerably above the forward moment and at full speed of the engine reaches very high values. If at high speed inadmissible ignition pressures should present themselves, it would be necessary to provide a speed limiting device for motion astern, or the supercharging would have to be limited again by diverting a part of the exhaust gas around the reverse turbine. The reverse moment would then have to be kept, from a medium engine speed onwards, roughly at the value of 100% of the normal moment.

The exhaust-gas turbine 20 as shown in Figs. 8 and 8a, possesses single nozzle groups, which can be cut out, and it could be installed, for instance, in an engine plant as shown in Fig. 7 in place of the set consisting of the forward and reverse turbines. The rotor 21 (Figs. 8 and 8a) is loaded by a series of nozzle groups 22, 23 and 24, which are supplied with exhaust gas through passages 25, 26 and 27 respectively. These passages 25–27 lead off, one after the other, from the exhaust-gas pipe 4 and can be closed in turn by means of a slide valve 28. This slide valve is adjusted by a servomotor piston 29, which is loaded on the one side by a spring 30 and by the control pressure supplied through pipe 31, and on the other side by the exhaust-gas pressure.

When the slide valve 28 moves from the right to the left, the opening of the passage 26 is first to be diminished and finally closed entirely. When this closing is complete, the closing of the inlet opening for passage 25 begins and when this passage is finally closed the inlet opening to passage 27 is closed. At an exhaust-gas pressure lying below the required normal value as the result of the action of spring 30, a larger number of nozzles is cut out by the slide valve 28 than when the pressure is above the normal value. Thus a balanced effect is obtained in so far as the exhaust gases are partly dammed up at low speeds and the supercharging pressure is thus increased. Only during motion astern is a control medium also supplied at a certain pressure through pipe 31, so that a greater pressure is exerted on the servomotor piston 29, the effect of this being to cut out a larger number of nozzles than during forward running and thus to diminish the absorption capacity of the turbine. The diminished absorption capacity gives rise in the cylinders of the internal combustion engine, during motion astern, to higher supercharging, which in its turn leads to a higher average pressure and thus to a greater driving moment of the internal combustion engine.

In order to be able to couple the turbine, which rotates in the same direction whether the internal combustion engine is running forwards or in reverse, to the crankshaft in both cases, a reversing gear 32 is also provided, which must be put in reverse at the same time as the internal combustion engine.

The course of the moments attained by the use of an exhaust-gas turbine according to Fig. 8 is represented in Fig. 3. Once more the curve $M_{mv}$ illustrates the forward moment of a supercharged engine, while the curve $M_{mr}$ shows the course of the moments for the reverse rotation of the engine according to Fig. 8. The moment runs in zig-zags, corresponding to the switching in or out of the single nozzle groups. First it rises in company with the rise of speed, then falls with the opening of a new passage, only to rise again with the speed, and so on till at full speed all the passages are open. When an internal combustion engine with a turbine as shown in Fig. 8 runs forwards, the driving moment $M_{mv}'$ will also follow the curve $M_{mr}$ in zig-zag fashion but at a lower level.

The internal combustion engine plant as shown in Fig. 9 is distinguished by the fact that the compressor 33 is driven not by the internal combustion engine 1 but by a special prime mover 34, for example a special internal combustion engine. The exhaust gases flow through an exhaust-gas 35 into an exhaust-gas passage 10. The output of the exhaust-gas turbine is again transmitted to the shaft 11 of a ship's screw 12 by way of a reversing gear 32 and a toothed gear 13. By adjusting the speed of the driving engine 34 of compressor 33, the supercharging pressure can be brought to the desired level.

The driving moment of a plant as shown in Fig. 9 may, for example, corresponding to the supercharging pressure to which the set is adjusted, follow the curve $M_{mv}$ of Fig. 4 during forward running and be maintained at all speeds in reverse at the maximum value of 100% as shown in the curve $M_{mr}$. By suitable adjustment of the speed of the compressor a still higher moment could also be maintained even at low reverse speeds, so that, according to the group of curves in Fig. 1, a still shorter braking time could be attained.

The exhaust-gas turbine plant as shown in Fig. 10 may be employed, for example, in a plant according to Fig. 9. The compressor 33, designed as an axial turbo-compressor, is driven not only by the special driving engine 34, but also by the exhaust-gas turbine 35. The output required of engine 34 thus decreases by the output given off by the exhaust-gas turbine.

The turbine 36 in Fig. 11 may be used, for example, in place of the turbines 5 and 6 of a plant as shown in Fig. 7. The rotor 37 is provided with radial flow blading, to which the exhaust gases are supplied centrally through pipe 4. Around pipe 4 and within the sealed annular chamber 43 formed between pipe 4 and an outer casing 4' is situated an annular slide valve 38, the outer end of which is formed into an annular piston 39 running in the annular chamber 43. This chamber communicates with the exhaust-gas passage 4 through an opening 42, so that the annular piston 39 is loaded from one side by the exhaust-gas pressure. A spring 40, and also the control pressure, supplied through the pipe 41 load the annular piston 39 from the other side in such a way that, when the exhaust-gas pressure rises, a larger admission area into the radial blading of turbine rotor 37 is freed than when the exhaust-gas pressure is lower.

By this means the supercharging pressures are already evened out to such an extent that a comparatively high supercharging pressure arises at low speeds. When the internal combustion engine runs in reverse, a control pressure is also brought to bear through the pipe 41, so that a still more pronounced decrease in the sectional area of flow arises and with it a corresponding increase of the supercharging pressure.

The turning moment for both directions of rotation runs as shown in the diagram in Fig. 5. Even the turning moment curve $M_{mv}'$ for forward running lies above the normal forward moment curve $M_{mv}$, this being the result of the throttling produced by the spring 40 (Fig. 11). By the increased throttling produced by the control pressure, the course of the moments for reverse running can be correspondingly raised as shown in curve $M_{mr}$.

A similar effect can be attained with an exhaust turbine, if a throttling point is arranged after the turbine. In this case, as shown in Fig. 12, a throttle valve 44 is arranged, after the turbine 36 in the exhaust gas pipe 10, with the help of which valve the same effect can be obtained as with the circular slide valve 38 in Fig. 11. A moment curve as shown in the diagram of Fig. 5 can also be obtained with this plant.

The exhaust gas turbine plant of Fig. 13 can likewise be employed instead of the two turbines 5 and 6 in an engine plant according to Fig. 7. The turbine 46 (Fig. 13) has a closing valve 47 and a diversion passage 48. When the engine runs in reverse, the valve 47 is brought into the closed position 47' indicated in the drawing, so that the valve 49 is pressed against the spring 50 by the exhaust gas pressure. The exhaust gases then flow through the diversion pipe 48 direct into the exhaust gas pipe 10. The tension of spring 50 is so adjusted that a higher supercharging pressure arises during reverse running than during forward running. The spring can be so designed that during reverse running the exhaust-gas pressure in pipe 4 and thus the supercharging pressure remains roughly at a constant level at all speeds.

In the engine according to Fig. 13 the moments run, during reverse service, as shown by the curve $M_{mr}$ in Fig. 6. Particularly at low speeds this moment curve runs considerably above the normal forward moment curve $M_{mv}$, so that a shortened braking of the vessel is rendered possible.

The invention is specially suited for service with two-stroke internal combustion engine plants. It can, however, be employed equally well with four-stroke plants.

Piston compressors with reciprocating pistons, rotary compressors, Roots blowers, etc., may be used as volumetric compressors; and turbo-compressors, for example, axial compressors or radial compressors, may also be used. The turbines may be either axial or radial turbines. The number of stages may be chosen as desired, for example, in accordance with the required absorption capacity. For compressors driven separately, any type of prime mover may be employed, for instance, electric motors, steam engines, etc., as well as internal combustion engines.

I claim:

1. In operating a marine propulsion plant of the type including a propeller, a reversible-rotation internal-combustion engine driving said propeller, and a source of air under pressure supercharging said engine, the step which includes regulating the supercharge pressure of said engine to a higher value when said engine is operated in reverse than when said engine is operated at a like speed forward for the purpose of increasing the engine turning moment when reverse rotation occurs.

2. In operating a marine propulsion plant of the type including a propeller, a reversible-rotation internal-combustion engine driving said propeller, a source of air under pressure supercharging said engine, and a turbine driven by the exhaust gases from said engine, the step which includes regulating the supercharge pressure of said engine to a higher value when said engine is operated in reverse than when said engine is operated at a like speed forward for the purpose of increasing the engine turning moment when reverse rotation occurs.

3. In operating a marine propulsion plant of the type including a propeller, a reversible-rotation internal-combustion engine driving said propeller, and a source of air under pressure supercharging said engine, the step which includes regulating the supercharge pressure of said engine at lower speeds to a higher value when said engine is operated in reverse than when said engine is operated at a like speed forward for the purpose of increasing the engine turning moment when reverse rotation occurs.

4. In operating a marine propulsion plant of the type including a propeller, a reversible-rotation internal-combustion engine driving said propeller, and a source of air under pressure supercharging said engine, the step which includes regulating the supercharge pressure of said engine at least to that maintained at normal forward speed while the engine is being put into reverse including the period when the engine is at a standstill for the purpose of increasing the engine turning moment when reverse rotation occurs.

HANS LIEBERHERR.

REFERENCES CITED

The following references are of record in the file of this patent:

UNITED STATES PATENTS

| Number | Name | Date |
|---|---|---|
| 1,680,775 | Faber | Aug. 14, 1928 |
| 1,943,860 | Flanders | Jan. 16, 1934 |
| 2,006,337 | Baasch | July 2, 1935 |
| 2,235,050 | Thege | Mar. 18, 1941 |

FOREIGN PATENTS

| Number | Country | Date |
|---|---|---|
| 204,691 | Great Britain | Apr. 9, 1925 |
| 206,845 | Great Britain | Feb. 21, 1924 |